United States Patent Office

3,114,647
Patented Dec. 17, 1963

3,114,647
COMPOSITION FOR INCREASING THE HARDNESS OF PORTLAND CEMENT AND PROCESS OF PRODUCING SAME
Virgil W. Mecham, deceased, late of Roosevelt, Utah, by Marba Mecham, administratrix, Roosevelt, Utah, assignor to R. V. Larson, Roosevelt, Utah
No Drawing. Filed Aug. 1, 1960, Ser. No. 46,844
5 Claims. (Cl. 106—89)

This invention relates to additives for Portland cement which alter the normal characteristics thereof, and is concerned with providing a composition of matter for addition to Portland cement during the mixing thereof, either as neat cement or as concrete, for making the set material harder and more durable and for making the wet mix easier to mold into various forms, such as bricks, tiles, shingles, and ornamental objects.

The composition of the invention is a clear solution obtained by intimately intermixing two solutions, one derived by reacting an aqueous solution of alum with sulfuric acid and the other by reacting an aqueous solution of calcium chloride with sulfuric acid.

The term "alum" is used in its broad sense, meaning a double sulfate of an alkali metal—or of the ammonium ion—and a trivalent metal, such as aluminum, iron, manganese, and chromium. It is also intended to include aluminum sulfate. However, commercial alum, i.e. potassium aluminum sulfate, has been used most successfully and is preferred for this reason.

Although the proportions of the several ingredients may be varied considerably, the best formulation appears to be as follows:

*Ingredients*

2 pounds powdered commercial alum
16 pounds calcium chloride
5 gallons of hot water (not boiling)
20 cubic centimeters ordinary concentrated sulfuric acid.

*Procedure*

Dissolve the alum in one gallon of the hot water and the calcium chloride in the remaining four gallons. Add four cubic centimeters of the sulfuric acid to the alum solution and the remaining sixteen cubic centimeters to the calcium chloride solution. Slowly pour the resulting alum solution into the resulting calcium chloride solution, while rapidly stirring the mixture.

The final solution resulting from the mixture of the two chemical solutions constitutes the composition of the invention. It is used in place of part of the water normally employed for making a neat cement mix or a concrete mix, the amount used in any given instance being determined by the degree of hardness desired for the set cement or concrete. Generally speaking, one part of the composition is added to from ten to twenty parts of water and the resulting solution used as water would be in the preparation of a cement or concrete mix in conventional manner, using the normal proportions of this "water" and cement, and sand, gravel, or other aggregate as found appropriate for the particular purpose.

Whereas this process is here described with respect to preferred specific practice, it should be understood that various changes may be made by those skilled in the art, without departing from the essential inventive contributions set forth herein and defined by the following claims.

I claim:
1. A composition of matter for increasing the hardness of structures and articles made from Portland cement and for making the wet mix easier to work consisting essentially of the following ingredients intermixed and chemically reacted in substantially the proportions indicated:

2 pounds powdered alum
16 pounds calcium chloride
5 gallons water
20 cubic centimeters sulfuric acid.

2. The composition of claim 1, wherein the alum is potassium aluminum sulfate.

3. A process for producing a composition of matter for increasing the hardness of structures and articles made from Portland cement and for making the wet mix easier to work, comprising the steps of dissolving about 2 pounds of alum in about 1 gallon of warm water; adding about 4 cubic centimeters of sulfuric acid to the resulting alum solution; dissolving about 16 pounds of calcium chloride in about 4 gallons of warm water; adding about 16 cubic centimeters of sulfuric acid to the resulting $CaCl_2$ solution; and slowly pouring the reacted alum solution into the reacted $CaCl_2$ solution while rapidly stirring the resulting solution.

4. The process of claim 3, wherein the alum is potassium aluminum sulfate.

5. A method of making a wet cementitious mix which is exceptionally easy to mold and which sets up exceptionally hard, comprising mixing with a dry cementitious mix an appropriate quantity of water treated by adding to from about ten to twenty parts of water about one part of a sulfuric-acid reacted, aqueous solution of alum intimately intermixed with a sulfuric-acid reacted, aqueous solution of calcium chloride, which mixture consists essentially of the following ingredients in about the proportions indicated:

2 pounds powdered alum
16 pounds calcium chloride
5 gallons water
20 cubic centimeters sulfuric acid.

References Cited in the file of this patent

UNITED STATES PATENTS

| | | |
|---|---|---|
| 2,336,723 | Drummond | Dec. 14, 1923 |
| 2,890,965 | Underdown | Jan. 16, 1959 |

FOREIGN PATENTS

| | | |
|---|---|---|
| 2616 of 1881 | Great Britain | June 16, 1881 |

OTHER REFERENCES

Lerch et al.: "The Sulphoaluminates of Calcium," U.S. Bureau of Standards, Journal of Research, volume 2, pages 715–731.